United States Patent Office 2,836,500
Patented May 27, 1958

2,836,500
PLASTIC COMPOSITION

Verne Wesley Weidman, Wilmington, Del., assignor to E. I. du Pont de Nemours and Company, Wilmington, Del., a corporation of Delaware No Drawing. Application March 17, 1955
Serial No. 495,035

10 Claims. (Cl. 106—38.9)

This invention relates to a new composition of matter having sufficient plasticity to be molded or trowelled into various shapes and structures which may be hardened by drying or baking to form useful structures and articles. It also relates to new articles and structures prepared from such compositions of matter. In its broad applications, this invention relates to new plastic compositions which, when molded and dried, baked, or fired, produce structures and articles having a highly refractive character. In certain specific aspects, the compositions can be molded and dried, baked, or fired to produce articles or structures having a relatively high heat transmission capacity.

It has long been desired to have a plastic substance that can be poured, molded, or trowelled into shapes and structures which can be hardened by drying or baking to form an efficient, solid heat transfer material.

It is frequently desired to maintain process fluids contained in pipelines, valves, or other containers at an elevated temperature to prevent crystallization, polymerization, objectionable lowering of viscosity, or freezing. This is most commonly done by providing the fluid containers with jackets containing vapors or liquids maintained at a desired elevated temperature. Such jacketing is very expensive and can not always be readily available. A low-cost alternate to jacketing comprises the wrapping or laying of tubing around or adjacent to the container to which it is desired to transfer heat, and passing a heating medium through such tubing. The positioning of heating tubes adjacent to a container or pipeline is referred to as "tracing." Tracing is quite readily installed but its effectiveness is very limited by reason of poor contact between the tracing and the object to be heated.

Attempts have been made to provide a plastic composition which, when applied over the installed tracing as a putty or plaster and dried, will improve the heat transmission from the tracing to the heated container. Finely divided metals, ceramic aggregates like silicon carbide, and graphite have been mixed with plastic substances or binders such as clay, resin, sodium silicate, and the like and a liquid vehicle, and this plastic medium packed or trowelled over the tracing positioned on the object to be heated.

The plastic compositions heretofore used for this purpose have been found to be deficient in several respects. In some cases, the adhesion was poor so that the dried material crumbled and cracked off in use. In some cases, the material had a high degree of alkalinity and was objectionably toxic and corrosive. The metal powders were often oxidized with the result that the heat transmission characteristics were low, or a large quantity of plastic substance or binder was needed to hold the mass in place. In other cases, the mass was not easily applied because of extreme stickiness.

It has also been heretofore desired to have a plastic composition that can be readily molded or otherwise shaped into metal casting molds and crucibles which after baking or firing have a relatively high refractiveness so that even high melting metals such as titanium can be cast into relatively smooth-surfaced, useful shapes and articles.

It is an object of this invention to provide new compositions of matter.

It is another object of this invention to provide new and useful structures and articles composed of a new composition of matter.

It is still another object of this invention to provide a new and improved composition of matter which may be readily molded, trowelled, or poured into various shapes or structures which may be hardened by drying or baking to form useful structures and articles having a highly refractory character.

It is a further object of this invention to provide an improved composition of matter which may be readily applied over a traced container and dried to form a tightly adhering solid having a high heat transmission capacity.

Other objects of this invention will appear hereinafter.

The objects of this invention may be accomplished, in general, by forming a mixture of a finely divided refractory material, a liquid vehicle that will be evaporated or volatilized from the mixture by heating, and a sodium oxyfluoborate. The mixture may be formed or shaped into a structure or article, or may be applied over a traced container, and then dried, baked, or fired to form useful structures or articles as will appear more in detail hereinafter.

Sodium oxyfluoborate is a compound described and claimed in copending application of Norval D. Clare and Alden J. Deyrup, Serial No. 469,024, filed November 15, 1954, now abandoned and replaced by continuation-in-part application Serial No. 585,153, filed May 16, 1956. As stated in that application, sodium fluoride and boric oxide form a definite addition compound of the formula $NaF \cdot 1.25B_2O_3$ or $4NaF \cdot 5B_2O_3$. This compound is referred to as sodium oxyfluoborate and is an anhydrous, non-crystalline, somewhat hygroscopic, water-white glass, melting reversibly over a range of temperatures at around 550°–700° C. The sodium oxyfluoborate forms with water a stable, solid hydrate of the formula

$$4NaF \cdot 5B_2O_3 \cdot 5H_2O$$

The physical properties of the hydrate are similar to those of the anhydrous compound except that it begins to soften at a lower temperature. Sodium oxyfluoborate may be obtained by mixing dry powders of sodium fluoride and boric acid in the correct stoichiometric quantities and heating the mixture under reflux at ambient pressure with stirring. The pentahydrate of sodium oxyfluoborate can readily be obtained by evaporating the 77% solution to dryness at around 100°–110° C. The anhydrous material can be obtained from the hydrate by heating the latter for an hour or two at around 650° C.

In addition to the definite sodium oxyfluoborate or sodium oxyfluoborate hydrate discussed above, i. e., as represented by the formulae $4NaF \cdot 5B_2O_3$ and

$$4NaF \cdot 5B_2O_3 \cdot 5H_2O$$

solid sodium fluoride reacts directly with solid boric acid to form initially clear aqueous solutions when the mole ratio of the mixture of the reactants, and hence of the product, is within the somewhat approximate

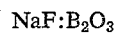

$$NaF:B_2O_3$$

limits of between about 4:4.68 and 4:5.80.

It has now been found that sodium oxyfluoborate is particularly desirable for use as a binder or cement with a finely divded refractory material, for example, metal or graphite particles, or particles of alumina, zirconia, zircon, chromia, titania, magnesia, silica, beryllia, or the like, to produce a composition which, when moistened with any liquid that is substantially inert to the other ingredients, for example, water, liquid hydrocarbon, turpentine, pine oil, vegetable and animal oils, or organic liquids, preferably organc liquids of relatively low volatility, can be molded, poured, or trowelled into shapes and articles which, when hardened by drying or baking, will have a highly refractory character. When it is desired to produce a composition that will have a relatively high heat transmission capacity, it will be necessary to use finely divided metal or graphite as the refractory material. Although metal powders such as copper, aluminum or iron powders can be used in producing a useful composition having good heat transmission characteristics, finely divided graphite has given much superior results as an efficient heat-transmitting product. Not only from a standpoint of heat transmission, but because of better adhesion, easier handling, and lighter weight.

The sodium oxyfluoborate to be used in the mixture may be the anhydrous material represented by the formula $NaF:B_2O_3$ in which the mole ratio of NaF to $B_2O_3$ may vary between 4:4.68 and 4:5.80, or it may be the pentahydrate of such sodium oxyfluoborate, e. g., a composition in the range of $4NaF \cdot 4.68B_2O_3 \cdot 5H_2O$ to $$4NaF \cdot 5.80B_2O_3 \cdot 5H_2O$$

The particle size of the refractory material used is not critical, particle sizes from 20 to 400 mesh being usable. Preferably, a mixture of fine and coarse sizes of particles are used to obtain the best results. For example, a mixture of coarse particles between 20 and 80 mesh with fine particles of 100 to 400 mesh will produce a highly desirable composition when the fine particles are present in about double the amount of the coarse particles.

When the hydrate is used in mixtures with graphite, the proportions of sodium oxyfluoborate hydrate to graphite should be within the ranges of between 4% and 50% by weight of the oxyfluoborate to between 50% and 96% by weight of finely divided graphite. When using the anhydrous oxyfluoborate proportionately, less may be used.

Somewhat improved results may be obtained by the addition to the aforesaid mixture of a plasticizing agent such as a plastic clay. Structures and articles having particularly desirable heat transmission characteristics have been obtained by the use of graphite and sodium oxyfluoborate compositions containing clays of the bentonitic or montmorillonite type.

When using mixtures of sodium oxyfluoborate hydrate with graphite and clay, the proportions of constituents should be in the approximate ranges of 4% to 50% by weight of sodium oxyfluoborate hydrate,
35% to 95.99% by weight of graphite, and
.01% to 15% by weight of clay.

When the clay to be used is bentonite, the optimum amount in the composition will be between about .01% and 2% by weight of the composition.

When it is desired to substitute a metal powder or other refractory material for graphite in the above-mentioned exemplary compositions, it may be used volume for volume in place of the graphite.

In preparing the plastic composition, it is preferred to add an aqueous solution of sodium oxyfluoborate to an aqueous dispersion of bentonite or other plastic clay and the refractry material added to the aqueous mixture; however, useful compositions can be made by mixing of the ingredients in any other order. The amount of water or other liquid vehicle used in the mixture will depend upon the desired consistency of the mixture. When the mixture is to be used for molding or trowelling, a mass having the consistency of plaster or putty is usually preferred. When the mixture is to be used in a casting or pouring operation in a form or mold, it may be most desirable to have the mass in the consistency of thick cream or grouting cement.

In using the plastic mixture for covering a traced object such as a traced pipeline, valve, or other container, it is usually prefered to plaster and trowel the mixture over the traced object so as to uniformly cover the tracing to a depth of one-eighth inch to one or more inches.

The object, covered with the plastic mixture, may then be dried either under atmospheric conditions or by applied heat. Temperatures of from 100° C. to 1000° C. may be used for this purpose of drying or baking.

If desired, the object having the dried or baked covering of the heat transmission material of this invention may be covered with a thermal insulation such as asbestos, 85% magnesia, cork, or similar material in a known manner.

Although the composition of this invention when prepared with a heat conductive refractory material has a desirable utility as a heat conductive covering on traced objects, it has many other uses as above indicated. I have discovered that these compositions, as well as compositions comprising non-heat conducting refractory materials, have outstanding utility for forming molds for the casting of metal, e. g., iron, steel, nickel, copper, etc., into desirable forms and shapes. Preliminary trials have shown that molds or crucibles shaped from such compositions and hardened by baking are surprisingly of especial utility for the casting of shaped articles from molten titanium. Heretofore, no satisfactory material was known that could be formed into a mold or crucible for the casting of articles from molten titanium.

The following example discloses a preferred composition and process for the production of metal casting molds or crucibles:

A 50% solution of sodium oxyfluoborate hydrate ($4NaF \cdot 5B_2O_3 \cdot 5H_2O$) is prepared by dissolving 183 grams of the same in 183 grams of water. A bentonite suspension is prepared by blending 4 grams of a swelling type of bentonitic clay with 36 grams of water. The bentonite suspension is thoroughly mixed with the solution of sodium oxyfluoborate for use as the liquid binder of the molding composition. A blend of graphite powders is then prepared using 240 grams of −20+60 mesh size, 240 grams of −60+100 mesh size, and 120 grams of −100+200 mesh size for a total weight of 600 grams.

The solution containing the bentonite is then thoroughly mixed with the graphite powder mixture to form a moldable composition. This material is then pressed around a pattern to make a metal casting mold or formed into any desirable shape such as a crucible (using a crucible mold). The shapes are slowly dried at gradually increasing temperatures up through 110° C. and then baked at a temperature in the range of 200°–1000° C., usually at about 700° C.

The following example discloses another composition and process for the production of metal casting molds or crucibles:

Two (2) parts by weight of a dry graphite powder are blended with one part by weight of pulverized sodium oxyfluoborate that had previously been melted. Sufficient linseed oil is added to the mixture of powders to produce a consistency suitable for making metal molds in accordance with conventional foundry practice. The shaped articles are then baked at 200°–400° C. to remove the liquid vehicle (linseed oil). A ceramic bond is developed by heating the objects on up to temperatures in the range of 700°–1000° C. The sodium oxyfluoborate powder fuses at these temperatures to develop a strong vitreous bond in this composition. Porosity of the mixture can be controlled by varying the particle size distribution of the graphite aggregate. Other refractory materials, e. g., alumina, zirconia, chromia, or magnesia, can be substituted for the graphite to produce metal mold compositions.

Since it is obvious that many changes and modifications can be made in the above-described details without departing from the nature and spirit of the invention, it is to be understood that the invention is not to be limited to said details except as set forth in the appended claims.

I claim:

1. A mixture composed essentially of 4% to 50% by weight of a substance from the group consisting of $NaF:B_2O_3$ and $NaF:B_2O_3 \cdot 5H_2O$ in which the mole ratio of NaF to $B_2O_3$ varies between 4:4.68 and 4:5.80, and 50% to 96% by weight of a finely divided heat conductive refractory material, with sufficient added water to induce in the mixture the desired plasticity.

2. The mixture of claim 1 in which the refractory material is graphite.

3. A mixture composed essentially of 4% to 50% by weight of a substance from the group consisting of $NaF:B_2O_3$ and $NaF:B_2O_3 \cdot 5H_2O$ in which the mole ratio of NaF to $B_2O_3$ varies between 4:4.68 and 4:5.80, 35% to 95.99% by weight of a finely divided heat conductive refractory material, and 0.01% to 15% by weight of clay, with sufficient added water to induce in the mixture the desired plasticity.

4. The mixture of claim 3 in which the refractory material is graphite.

5. The mixture of claim 3 in which the refractory material is graphite and the clay is bentonite.

6. A traced container covered with a solid heat transfer composition composed essentially of 4% to 50% by weight of a substance from the group consisting of $NaF:B_2O_3$ and $NaF:B_2O_3 \cdot 5H_2O$ in which the mole ratio of NaF to $B_2O_3$ varies between 4:4.68 and 4:5.80, and 50% to 96% by weight of a finely divided heat conductive refractory material.

7. A traced container as defined in claim 6 in which the refractory material is graphite.

8. A traced container covered with a solid heat transfer composition composed essentially of 4% to 50% by weight of a substance from the group consisting of $NaF:B_2O_3$ and $NaF:B_2O_3 \cdot 5H_2O$ in which the mole ratio of NaF to $B_2O_3$ varies between 4:4.68 and 4:5.80, 35% to 95.99% by weight of a finely divided heat conductive refractory material, and 0.01% to 15% by weight of clay.

9. A traced container as defined in claim 8 in which the refractory material is graphite.

10. A traced container as defined in claim 8 in which the refractory material is graphite and the clay is bentonite.

References Cited in the file of this patent

UNITED STATES PATENTS

| Number | Name | Date |
| --- | --- | --- |
| 1,886,252 | Gann et al. | Nov. 1, 1932 |
| 1,917,759 | Gann | July 11, 1933 |
| 2,196,971 | Boughton | Apr. 16, 1940 |
| 2,201,366 | Grodsky | May 21, 1940 |
| 2,753,608 | Nolan | July 10, 1956 |

OTHER REFERENCES

Ryss et al.: "Equilibrium in the System Sodium Fluoride-Boric Acid," J. Applied Chem., U. S. S. R., Eng. Trans. 25, pp. 157–161 (1952), No. 2, February.